United States Patent
Damji et al.

(10) Patent No.: US 9,596,638 B2
(45) Date of Patent: Mar. 14, 2017

(54) APPARATUS, SYSTEMS AND METHODS FOR IMPROVED LINK QUALITY EVALUATION OF MOBILE CELLULAR SYSTEMS

(71) Applicant: APPLE INC., Cupertino, CA (US)

(72) Inventors: Navid Damji, Cupertino, CA (US); Shivesh Makharia, Santa Clara, CA (US); Luciano M. Verger, Santa Clara, CA (US); Samy Khay-Ibbat, San Francisco, CA (US); Johnson O. Sebeni, Fremont, CA (US); Sree Ram Kodali, Sunnyvale, CA (US); Sreevalsan Vallath, Dublin, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/871,493

(22) Filed: Sep. 30, 2015

(65) Prior Publication Data

US 2016/0234750 A1    Aug. 11, 2016

Related U.S. Application Data

(60) Provisional application No. 62/114,683, filed on Feb. 11, 2015.

(51) Int. Cl.
*H04B 17/00* (2015.01)
*H04W 36/30* (2009.01)
(Continued)

(52) U.S. Cl.
CPC .......... *H04W 36/30* (2013.01); *H04L 1/0003* (2013.01); *H04W 28/22* (2013.01); *H04L 1/1812* (2013.01);
(Continued)

(58) Field of Classification Search
CPC ......... H04W 72/1252; H04W 72/0413; H04W 72/085; H04W 72/087; H04W 36/30;
(Continued)

(56) References Cited

U.S. PATENT DOCUMENTS

2007/0270100 A1* 11/2007 Agrawal ............... H04B 17/005
455/67.11
2009/0196177 A1* 8/2009 Teyeb .................. H04B 7/2606
370/231

(Continued)

*Primary Examiner* — Khai M Nguyen
(74) *Attorney, Agent, or Firm* — Fay Kaplun & Marcin, LLP

(57) ABSTRACT

Apparatus, system and methods for evaluating link quality within a cellular system. A user equipment ("UE") is connected to a network, wherein the UE communicates data to the network on an uplink ("UL") link. The UE determines a requested buffer size for a UL communication, determines a transport block size for the UL communication based on a primary set of allocation parameters, and compares the requested buffer size to the transport block size to determine if a data rate for the UL communication satisfies a threshold. When the data rate satisfies the threshold, the UE identifies the UL link as a good quality link and sends acceptable link quality feedback to the network. When the data rate does not satisfy the threshold, the UE performs a further action to test a quality of the UL link.

20 Claims, 4 Drawing Sheets

(51) Int. Cl.
*H04L 1/00* (2006.01)
*H04W 28/22* (2009.01)
*H04L 1/18* (2006.01)
*H04W 36/00* (2009.01)
*H04W 36/14* (2009.01)
*H04W 88/06* (2009.01)
*H04W 72/12* (2009.01)

(52) U.S. Cl.
CPC ........ *H04W 36/0022* (2013.01); *H04W 36/14* (2013.01); *H04W 72/1284* (2013.01); *H04W 88/06* (2013.01)

(58) Field of Classification Search
CPC . H04W 36/0022; H04W 36/14; H04W 88/06; H04W 28/22; H04W 72/1284; H04B 17/005; H04L 1/0003; H04L 1/1812
USPC .......... 455/67.11, 436, 67.14, 550.1
See application file for complete search history.

(56) References Cited

U.S. PATENT DOCUMENTS

| | | | |
|---|---|---|---|
| 2011/0151877 A1* | 6/2011 | Tafreshi | H04W 36/18 455/442 |
| 2013/0051214 A1* | 2/2013 | Fong | H04W 24/10 370/216 |
| 2014/0126399 A1* | 5/2014 | Damnjanovic | H04W 72/1252 370/252 |
| 2014/0317241 A1* | 10/2014 | Zhao | H04L 65/608 709/219 |

* cited by examiner

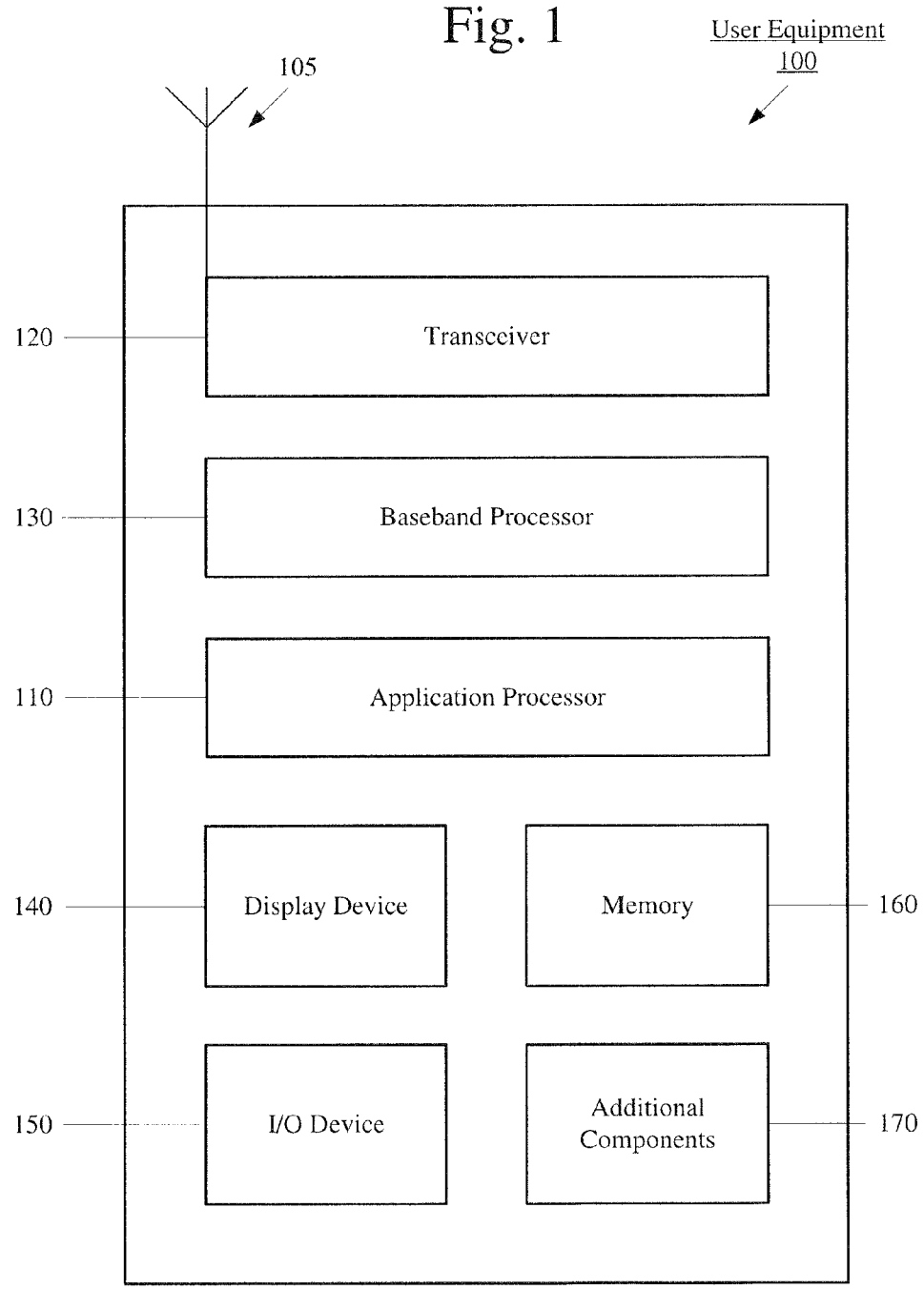

Fig. 2   Network Arrangement 200
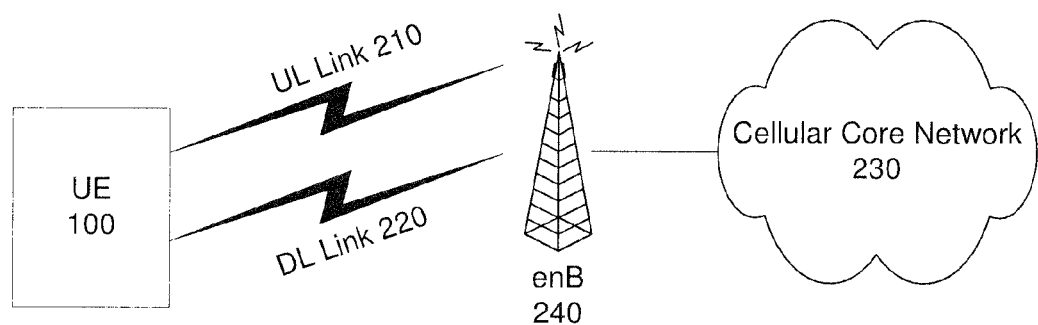

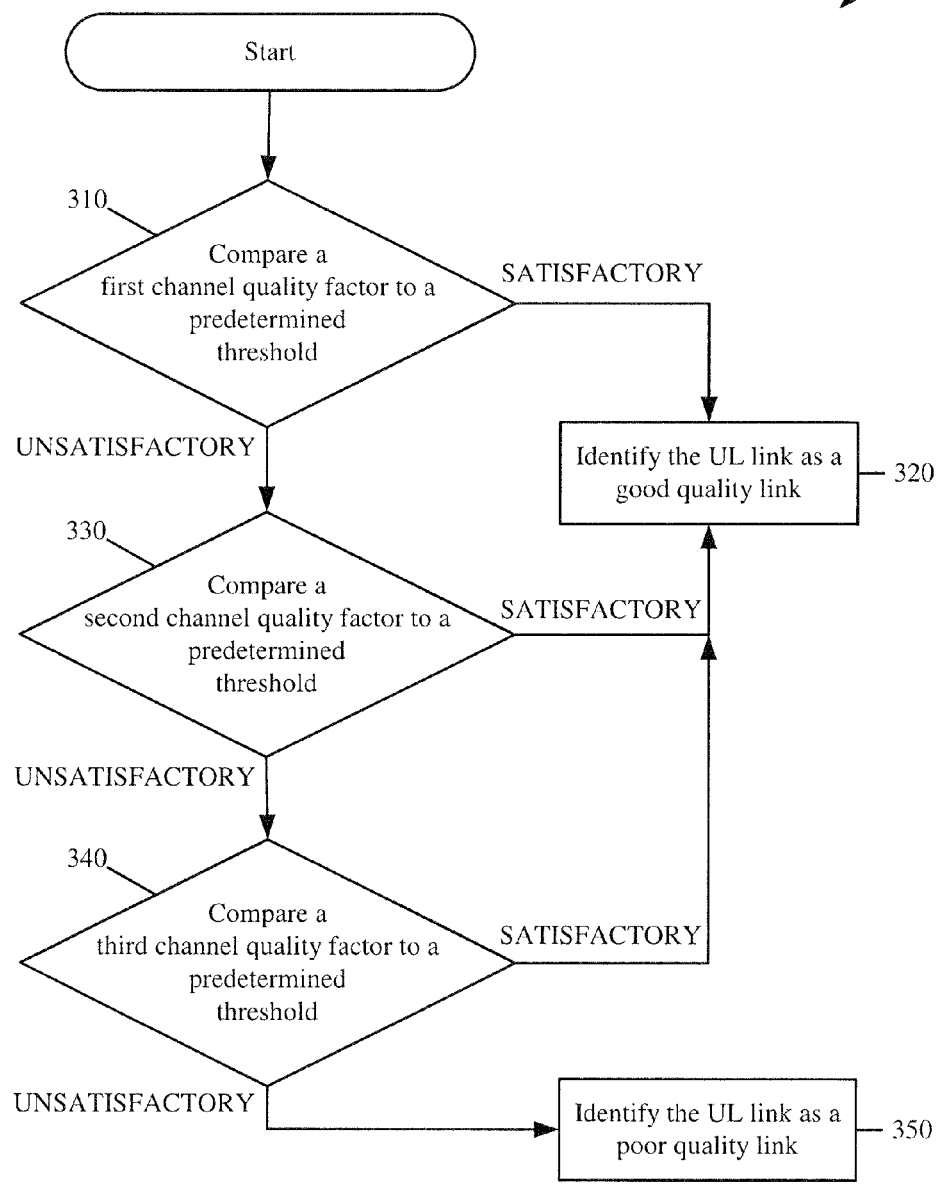

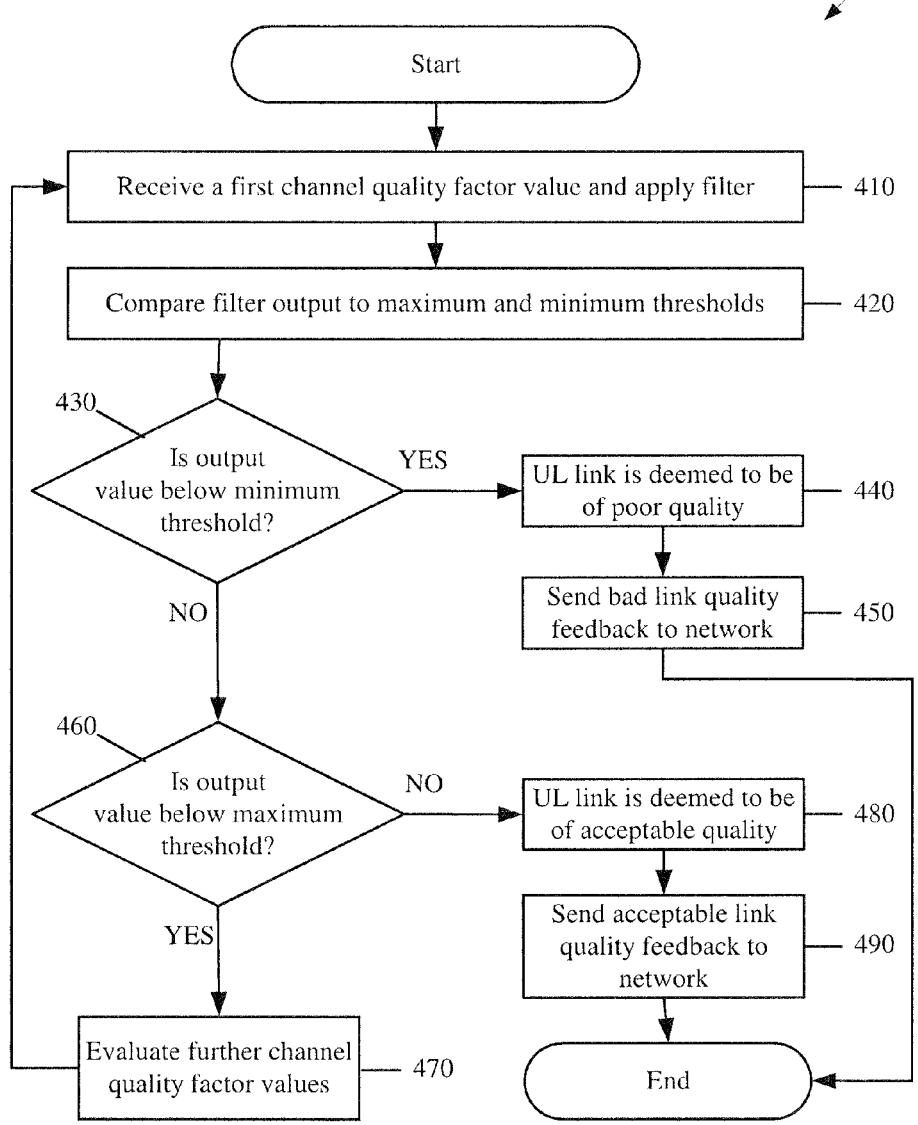

APPARATUS, SYSTEMS AND METHODS FOR IMPROVED LINK QUALITY EVALUATION OF MOBILE CELLULAR SYSTEMS

PRIORITY INFORMATION/INCORPORATION BY REFERENCE

This application claims priority to U.S. Provisional Application 62/114,683 entitled "Systems and Methods for Improved Link Quality Evaluation of Mobile Cellular Systems," filed on Feb. 11, 2015, the entirety of which is incorporated herein by reference.

BACKGROUND

A cellular network, such as a mobile device network, is a wireless network distributed over land areas referred to as cells, wherein each cell is served by at least one fixed-location transceiver, such as a cell site or a base station. Within a cellular network, each cell uses a set of frequencies where at least some of the frequencies within the set of frequencies are different from frequencies being used by neighboring cells in order to avoid interference while providing guaranteed bandwidth within each of the cells. When joined together these cells provide radio coverage over a wide geographic area. Accordingly, the cellular network enables a large number of portable transceivers (e.g., mobile phones, tablets, wearables, etc.) to communicate with each other and with fixed transceivers and telephones anywhere in the network via base stations. Furthermore, these portable transceivers are able to maintain connectivity with the cellular network even while moving through more than one cell during transmission.

In cellular communications, link quality evaluation is important for several purposes. The metrics used for link quality assessment are based on downlink measurements, such as Channel Quality Indicator ("CQI"), Received Signal Strength Indicator ("RSSI") and Reference Signal Received Power ("RSRP"), etc. Furthermore, these metrics are primarily used for network-controlled features such as link rate adaptation, handovers, cell selection and re-selection, etc.

SUMMARY

Some exemplary embodiments include a method performed by a user equipment ("UE") connected to a network, wherein the UE communicates data to the network on an uplink ("UL") link. The method includes determining a requested buffer size for a UL communication, determining a transport block size for the UL communication based on a primary set of allocation parameters, comparing the requested buffer size to the transport block size to determine if a data rate for the UL communication satisfies a threshold, when the data rate satisfies the threshold, identifying the UL link as a good quality link and sending acceptable link quality feedback to the network and when the data rate does not satisfy the threshold, performing a further action to test a quality of the UL link.

Other exemplary embodiments include a user equipment ("UE") connected to a network via an uplink ("UL") link, the UE having a processor configured to control establishing and releasing connections between the wireless communication device and a first wireless network and between the wireless communication device and a second wireless network, a transceiver configurable to transmit and receive signals to the first wireless network according to a first wireless communication protocol and to the second wireless network according to a second wireless communication protocol and a non-transitory memory having a program stored thereon. The execution of the program causes the processor to perform operations comprising determining a requested buffer size for a UL communication, determining a transport block size for the UL communication based on a primary set of allocation parameters, comparing the requested buffer size to the transport block size to determine if a data rate for the UL communication satisfies a threshold, when the data rate satisfies the threshold, identifying the UL link as a good quality link and sending acceptable link quality feedback to the network; and when the data rate does not satisfy the threshold, performing a further action to test a quality of the UL link.

Further exemplary embodiments include a method performed by a user equipment ("UE"). The method includes comparing a first channel quality factor determined at the UE to a first threshold value, wherein the UE is connected to a network and communicates with the network on a link, when the first channel quality factor satisfies the first threshold, identifying the link as a good quality link and sending acceptable link quality feedback to the network, when the first channel quality factor does not satisfy the first threshold, comparing a further channel quality factor determined at the UE to a further threshold value, when the further channel quality factor satisfies the further threshold, identifying the link as a good quality link and sending acceptable link quality feedback to the network and when the further channel quality factor does not satisfy the further threshold, performing a further action to test a quality of the UL link.

DESCRIPTION OF THE DRAWINGS

FIG. 1 shows an exemplary user equipment ("UE") for improved link quality evaluation by a mobile device using allocation parameters measured on an uplink ("UL") link according to some embodiments described herein.

FIG. 2 shows an exemplary network arrangement.

FIG. 3 shows an exemplary method for improved link quality evaluation by a mobile device using allocation parameters measured on a UL link according to some embodiments described herein.

FIG. 4 shows a further exemplary method for improved link quality evaluation by a mobile device using a filtering system according to some embodiments described herein.

DETAILED DESCRIPTION

The exemplary embodiments may be further understood with reference to the following description and the appended drawings, wherein like elements are referred to with the same reference numerals. The exemplary embodiments show apparatuses, systems and methods for improved link quality evaluation for mobile cellular systems. For instance, exemplary embodiments described herein may allow for some metrics to be used to evaluate uplink ("UL") link quality. Furthermore, these exemplary embodiments also provide an application that may use the evaluated metrics to perform an action.

As discussed above, conventional link quality evaluations are based on downlink ("DL") measurements. For example, a target link quality may be defined by the maximum acceptable block error rate ("BLER") in the DL. Based upon this target link quality, a signal-to-noise ratio ("SNR") metric may be used to determine the best operating modulation and coding schemes ("MCS") index for the DL link.

An MCS index may then be mapped to a CQI index. Accordingly, the best operating CQI index at the UE may be defined as a function of target link quality and the current SNR statistic. When the link quality improves, CQI is increased, allowing for a higher MCS index to be supported for the specified target link quality. Alternatively, when the link quality deteriorates, CQI is reduced.

In several radio access technologies ("RATs"), link quality measurements may be used for performing intra-frequency handovers. For instance, the UE in a Long Term Evolution ("LTE") network may select an eNodeB (eNB) having the best link quality measurements. In this exemplary LTE network, the link quality may be indicated by the RSRP for an LTE cell and the reference signal code power ("RSCP") for the Universal Mobile Telecommunications System ("UMTS") cell. Accordingly, the selection of the eNB having the best link quality is advantageous for both managing interference and prolonging the battery life of the UE.

There are many applications where alternative measurements of link quality may be used to improve the performance of the UE, as well as the user experience and perception. Many of these metrics may be based on UL link performance. Furthermore, the existing standardized measurements of link quality even in the DL link may be inadequate to use for device performance.

As will be described in greater detail below, the exemplary embodiments allow for the UE to reduce radio transmission time and conserve battery life by eliminating voice/data timeouts while maintaining session continuity. For instance, within voice and data applications, an exemplary network may determine UL grant allocations based on any number of factors. These factors may include, but are not limited to, a requested buffer size from the UE, the UL link quality, UL transmit power, UL resource availability, etc.

While the UE may be aware of the requested buffer size, information related to the link quality may not be directly available. That is, while the network may be aware of the UL link quality, this information is not available to the UEs. According to the exemplary embodiments described herein, the UE may determine the link quality of the UL by analyzing various allocation parameters. For instance, the various allocation parameters may include a modulation and coding scheme ("MCS") of the link, resource block allocation, transmit power and/or a power headroom report, a hybrid automatic repeat request ("HARQ") retransmission rate, etc.

For example, for voice applications on the UE, the UL data rate may be presumed to be a fixed rate. Therefore, certain primary allocation parameters (e.g., the MCS of the link and the resource block allocation) may be combined to determine a transport block size. The transport block size in comparison to a requested buffer size may then uniquely provide an assessment as to the data rate that is being supported by the network.

However, the transport block size alone may not provide an adequate assessment of the UL link quality. While the transport block size may be smaller than expected, this may not be solely attributed to a poor quality UL link. For example, the transport block size may be lower than expected due to other factors such as congestion on the network. Rather, the transport block size is an indication that the UL link may be of a poor quality. Therefore, additional metrics, or secondary allocation parameters, may be used by the UE to augment the transport block measurements. The secondary allocation parameters may include the transmit power/power headroom report and the average HARQ retransmission data. Accordingly, by using the augmented transport block measurements, the UE may determine a more complete evaluation of the UL link quality.

As will be described in greater detail below, the exemplary apparatus, systems and methods may include the use of a tiered or threshold approach to evaluating UL link quality. For instance, the UE may initially evaluate the transport block size allocations and compare them against a nominal data rate requirement. If the allocations are below a predetermined threshold, then the UE may evaluate the secondary allocation parameters, such as transmit power and average HARQ retransmissions. If these secondary allocation parameters are below a further threshold, then the UE may indicate that the UL link quality is poor.

FIG. 1 shows an exemplary UE 100 for improved link quality evaluation by a mobile device using allocation parameters measured on an uplink ("UL") link according to some embodiments described herein. The UE 100 may represent any electronic device that is configured to perform wireless functionalities. For example, the UE 100 may be a portable device such as a phone, a smartphone, a tablet, a phablet, a laptop, wearable, etc. In another example, the UE 100 may be a stationary device such as a desktop terminal. The UE 100 may be a VoLTE-capable SRLTE device for communicating with a mobile switching center. The UE 100 may include an antenna 105 connected to a transceiver 120, which is connected to a baseband processor 130, which is further connected to an applications processor 110. The UE 100 may further include a display 140, an I/O device 150, and a memory arrangement 160 that are accessible by the baseband processor 130 or the applications processor 110. Those skilled in the art will understand that the UE 100 may also include additional components 170, for example, a Bluetooth/WiFi transceiver, further input devices (e.g., a keypad, a touchscreen, etc.), a battery, etc.

The transceiver 120 and the baseband processor 130 may be used to perform operations such as, but are not limited to, scanning the network for specific radio frequency bands, exchanging information with one or more mobile switching centers, etc. For instance, the antenna 105, in combination with the transceiver 120, may perform the scanning of radio bands and evaluating the link quality of available links within the network. In addition, it may be noted that the exemplary UE 100 may feature voice over internet protocol ("VoTLE") communications, wherein the UE 100 may change (e.g., lower) the CODEC rate based on UL link quality measurements. Furthermore, the UE 100 may also transition or "hand-over" from a VoTLE-based network to a different RAT network (e.g., a 3G network) using single radio voice call continuity "SRVCC." Specifically, the UE 100 may request the servicing base station to hand-over the UE 100 to a different base station.

It should be noted that the exemplary embodiments are described as being performed by the transceiver 120 and the baseband processor 130. However, either of these components may perform the described functionalities without the other component. In addition, other components (e.g., the application processor 110) may also perform some or all of the functionalities described herein. The application processor 110, the transceiver 120 and the baseband processor 130 may be, for example, general purpose processors, an application specific integrated circuit (ASIC), another type of integrated circuit and these processors may execute software programs or firmware.

FIG. 2 shows an exemplary network arrangement 200. The exemplary network arrangement 200 includes a cellular core network 230, at least one base station 240 (e.g., Node Bs, eNodeBs, HeNBs, etc.), and the UE 100, as well as additional UEs (not shown). The cellular core network 230 and base station 240 may form part of a cellular network of a network provider. The cellular networks may be deployed by any network provider (e.g., Verizon, AT&T, Sprint, T-Mobile, etc.). As described above, the UE 100 may be configured to communicate directly with the base station 240 that is configured to send and receive traffic from client stations that are equipped with the appropriate cellular chip sets. Specifically, the UE 100 may communicate with the cellular core network 230 via a UL link 210 connection and a DL link 220 connection to the base station 240.

Those skilled in the art will understand that the UE 100 may communicate with the cellular core network 230 using any number of various protocols, such as a Long Term Evolution radio access network ("LTE-RAN"), a legacy radio access network ("RAN"), etc. Examples of the legacy RAN may include those networks that are generally labeled as second generation ("2G") and/or third generation ("3G") networks and may include circuit switched voice calls and packet switched data operations. Furthermore, those skilled in the art will understand that the network providers may also deploy other types of networks, including further evolutions of the cellular standards, within their cellular networks.

FIG. 3 shows an exemplary method 300 for improved link quality evaluation by a mobile device using allocation parameters measured on the UL link 210 according to some exemplary embodiments described herein. As discussed above, an exemplary communications network may be aware of the link quality between a base station, such as base station 240, and a mobile device, such as the UE 100. However, the UE 100 is typically not aware of this link quality, as the link quality is not directly available to the UE 100. According to the exemplary embodiments, the UE 100 may determine and evaluate the link quality between itself and a base station based on any number of allocation parameters. It should be noted that in the method 300, the evaluations that are performed are described as comparing channel quality factors against a threshold. It should be understood that the channel quality factors may be the allocation parameters or values that are derived or calculated from the allocation parameters.

The method 300 illustrates a tiered approach to the UL link quality evaluation. That is, the UL link is evaluated step-wise through a series of parameters to determine if the UL link is of a poor quality. It should be noted that while the data rate is fixed for voice communications, the data rate for data applications may not be fixed. However, for data applications the occupied buffer size may be used in the same manner as the requested block size for voice communications to estimate the nominal data rate.

In 310, the UE 100 may evaluate a first channel quality factor of the UL link 210. For instance, the first channel quality factor may be transport block size allocations. Accordingly, the UE 100 may determine a transport block size for the UL link based on a primary set of allocation parameters, such as the MCS used at the exemplary UL link and the resource block allocation data at the UL link. Since the data rate may be fixed for voice applications on the UE 100, the UE 100 may combine the MCS data and the resource block allocation data to determine the transport block size. As noted above, the transport block size gives an idea as to the rate at which the network can support the UE 100.

During 310, the UE 100 may compare the first channel quality factor to a predetermined threshold. For instance, the transport block size allocations may be compared against a nominal data rate requirement. If the transport block size allocations satisfy the threshold, then the method 300 may advance to 320 wherein the UE 100 may identify the UL link 210 as a good quality link and send acceptable link quality feedback to the network. If the transport block size allocations do not satisfy the threshold, then the method 300 may advance to 330 wherein further channel quality factors of the UL link 210 may be examined.

In 330, the UE 100 may evaluate a second channel quality factor of the UL link 210. As described above, the use of only transport block size allocations determined in 310 may not provide an accurate evaluation of the link quality of the UL link 210. For example, the data rate may be lower than expected, but this may not be due to the UL link quality, but rather due to another factor, such as network congestion. Thus, the method 300 advances to the next tier to evaluate secondary allocation parameters to provide a more complete picture of the UL link quality.

For instance, the second channel quality factor may be average HARQ retransmissions along the UL link 210. During 330, the UE 100 may compare the HARQ retransmissions value to a predetermined threshold value for the number of HARQ retransmissions. If the number of retransmissions satisfies the threshold, then the method 300 may advance to 320 where the UE 100 may identify the UL link 210 as a good quality link and send acceptable link quality feedback to the network. If the number of retransmissions does not satisfy the threshold, then the method 300 may advance to 340 (e.g., the next tier) where further channel quality factors of the UL link 210 may be examined.

In 340, the UE 100 may evaluate a third channel quality factor of the UL link 210. For instance, the third channel quality factor may be the transmission power on the UL link 210 and/or the power headroom report for the UL link 210. During 340, the UE 100 may compare the transmission power information to a predetermined threshold value for transmission power or power headroom. If the threshold is satisfied, then the method 300 may advance to 320 where the UE 100 may identify the UL link 210 as a good quality link and send acceptable link quality feedback to the network. If the threshold is not satisfied, then the method 300 may advance to 350.

In 350, when each of the channel quality factors failed to satisfy their respective thresholds, the UE 100 may identify the UL link 210 as a poor quality link and send poor link quality feedback to the network. It is noted that while method 300 related to evaluating three tiers of channel quality factors on the UL link 210, those skilled in the art will understand that any number of factors may be evaluated by the UE 100. That is, the evaluation may have any number of tiers. In addition, while the transport block size allocation was described as a primary allocation parameter and the other allocation parameters were described as secondary parameters, this is not a requirement of the exemplary embodiments. The evaluation of the allocation parameters may be performed in any order and there is also no requirement that the transport block size allocation be evaluated as part of the method 300, e.g., the three exemplary channel quality factors that are evaluated may be three allocation parameters that were described as secondary parameters. It should also be noted that while this multi-tiered evaluation is applied to the UL link, it may also be applied to DL link evaluation to enhance the current DL link evaluation performed by the UE.

FIG. 4 shows a further exemplary method 400 for improved link quality evaluation by a mobile device, such as UE 100, according to some embodiments described herein. The exemplary method 400 describes a more detailed description of one of the evaluation tiers performed by the UE 100 on the UL link 210, such as 310 of method 300 of FIG. 3. While the method 400 relates to evaluating a first channel quality factor, such as transport block size allocations, it should be noted that the method 400 may be applied to any other evaluations performed by the UE 100. Accordingly, the method 400 may also be applied to evaluating the number of HARQ retransmissions over the UL link 210 (e.g., 330 of FIG. 3), the transmission power on the UL link 210 (e.g., 340 of FIG. 3), etc.

In 410, the UE 100 may receive a first channel quality factor value, such as the transport block size allocations. Furthermore, the method 400 may employ a filtering process (e.g., a finite impulse response ("FIR") filter, an infinite impulse response ("IIR") filter, etc.) to the UL link quality evaluation procedures in order to obtain a good statistical behavior. Furthermore, each of the filters applied to the channel quality factor values may be specific to that factor. For instance, the filters may include a transport block size allocation filter, a HARQ filter, a transmission power filter, etc. Each of these various filters may be updated and maintained by the network or the UE 100.

In 420, the UE 100 may compare the output of the filtering process to a minimum value threshold and a maximum value threshold for the quality factor value. Accordingly, in 430, the UE 100 determines if the filtered transport block size allocations is below the minimum value threshold. If the transport block size allocation is below the minimum threshold value, the method 400 may advance to 440 wherein the UL link 210 is deemed to be of poor quality. In 450, the UE 100 may transmit bad link quality feedback to the network. It should be noted that this would be equivalent to advancing to 350 of method 300 directly from step 310. In other words, the quality factor value is below an acceptable value and therefore no additional tests need to be performed to indicate that the UL link 210 is of a poor quality.

If the transport block size allocation is above the minimum threshold value, the method 400 may advance to 460. In 460, the UE 100 determines if the filtered transport block size allocations is above the maximum value threshold. If the transport block size allocation is below the maximum threshold value, the method 400 may advance to 470 wherein further channel quality factors of the UL link 210 may be examined to determine the quality of the UL link 210. Accordingly, the exemplary method 400 may return to 410 where a further channel quality factor value is examined by the UE 100, such as the HARQ retransmissions over the UL link 210 (e.g., 330 of FIG. 3), the transmission power on the UL link 210 (e.g., 340 of FIG. 3), etc.

Returning to 460, if the transport block size allocation is above the maximum threshold value, the method 400 may advance to 480 where the UL link 210 is deemed to be of good quality. In 490, the UE 100 may transmit acceptable link quality feedback to the network.

The exemplary embodiments described above may be implemented in any number of scenarios to improve the overall operations of the UE 100 for evaluating the UL link quality. For instance, the exemplary systems and methods described above may allow for codec rate adaptation, wherein upon identifying a poor UL link quality, a lower codec rate for voice communications may be used by the UE 100. In addition, the UE 100 may determine UL link quality is better at one particular RAT over another. Specifically, if the current RAT of the UE 100 is limited on the UL link, then the UE 100 may choose to go to another RAT. Further, the exemplary systems and methods described herein may allow for the UE 100 to determine optimum hardware settings when the UL link communication is constrained, e.g., power settings, etc. Thus the UE identifying the UL link quality may result in improved operational parameters for the UE.

Furthermore, the exemplary embodiments may also allow for the UE determination of UL quality to be implemented at the network side in order to assist the network in additional decision-making tasks. For instance, UL link quality evaluation may allow for the network to decided whether to trigger a hand-over to an inter-frequency neighboring base station (e.g., from an LTE base station to another LTE base station) or a hand-over to a legacy neighboring base station (e.g., from an LTE base station to a 3G base station using SRVCC). Accordingly, the network may evaluation similar measures on the network side, such as the primary and secondary allocation parameters, as the network may already have this information readily available.

In addition, as described above, the exemplary evaluations may be extended into DL link quality evaluation. In addition to the current metrics, such as RSRP and CQI, that are being used by the network, UL link quality metric equivalents may be applied on the DL links. These metrics may include allocation parameters such as MCS and average HARQ retransmissions on the DL link. Thus, by applying the filtering methods discussed above to these metrics, similar techniques may be applied on the DL link for audio codec rate adaptation and other DL applications.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE") connected to a network, wherein the UE communicates data to the network on an uplink ("UL") link:
      determining a requested buffer size for a UL communication;
      determining a transport block size for the UL communication based on a primary set of allocation parameters;
      comparing the requested buffer size to the transport block size to determine a data rate for the UL communication that is being supported by the network;
      determining when the data rate for the UL communication satisfies a threshold;
      when the data rate satisfies the threshold, identifying the UL link as a good quality link and sending acceptable link quality feedback to the network; and
      when the data rate does not satisfy the threshold, performing a further action to test a quality of the UL link.

2. The method of claim 1, wherein the primary set of allocation parameters includes at least one of a modulation and coding scheme ("MCS") and a resource block allocation.

3. The method of claim 1, wherein the further action includes:
   determining when a transmit power value satisfies a transmit power threshold;

when the transmit power value satisfies the transmit power threshold, identifying the UL link as a good quality link and sending acceptable link quality feedback to the network; and when the transmit power value does not satisfy the transmit power threshold, identifying the UL link as a poor quality link and sending poor link quality feedback to the network.

4. The method of claim 1, wherein the further action includes:

determining when a power headroom value satisfies a power headroom threshold;

when the power headroom value satisfies the power headroom threshold, identifying the UL link as a good quality link and sending acceptable link quality feedback to the network; and when the power headroom value does not satisfy the power headroom threshold, identifying the UL link as a poor quality link and sending poor link quality feedback to the network.

5. The method of claim 1, wherein the further action includes:

determining when a hybrid automatic repeat request ("HARQ") retransmission rate satisfies a HARQ retransmission rate threshold;

when the HARQ retransmission satisfies the HARQ retransmission threshold, identifying the UL link as a good quality link and sending acceptable link quality feedback to the network; and when the HARQ retransmission does not satisfy the HARQ retransmission threshold, identifying the UL link as a poor quality link and sending poor link quality feedback to the network.

6. The method of claim 1, further comprising:

filtering the primary set of allocation parameters using one of a finite impulse response ("FIR") filter and an infinite impulse response ("IIR") filter.

7. The method of claim 1, further comprising:

identifying the UL link as a poor quality link; and performing at least one of:
lowering an audio codec rate used on the UL link,
selecting a different UL link associated with a different radio access technology ("RAT"), and
triggering a hand-over to a neighboring node.

8. A user equipment ("UE") connected to a network via an uplink ("UL") link, comprising:

a processor configured to control establishing and releasing connections between the UE and a first wireless network and between the UE and a second wireless network;

a transceiver configurable to transmit and receive signals to the first wireless network according to a first wireless communication protocol and to the second wireless network according to a second wireless communication protocol; and a non-transitory memory having a program stored thereon, wherein execution of the program causes the processor to perform operations comprising:

determining a requested buffer size for a UL communication;

determining a transport block size for the UL communication based on a primary set of allocation parameters;

comparing the requested buffer size to the transport block size to determine a data rate for the UL communication that is being supported by the network;

determining when the data rate for the UL communication satisfies a threshold;

when the data rate satisfies the threshold, identifying the UL link as a good quality link and sending acceptable link quality feedback to the network; and when the data rate does not satisfy the threshold, performing a further action to test a quality of the UL link.

9. The UE of claim 8, wherein the primary set of allocation parameters includes at least one of a modulation and coding scheme ("MCS") and a resource block allocation.

10. The UE of claim 8, wherein the further action includes:

determining when a transmit power value satisfies a transmit power threshold;

when the transmit power value satisfies the transmit power threshold, identifying the UL link as a good quality link and sending acceptable link quality feedback to the network; and when the transmit power value does not satisfy the transmit power threshold, identifying the UL link as a poor quality link and sending poor link quality feedback to the network.

11. The UE of claim 8, wherein the further action includes:

determining when a power headroom value satisfies a power headroom threshold;

when the power headroom value satisfies the power headroom threshold, identifying the UL link as a good quality link and sending acceptable link quality feedback to the network; and when the power headroom value does not satisfy the power headroom threshold, identifying the UL link as a poor quality link and sending poor link quality feedback to the network.

12. The UE of claim 8, wherein the further action includes:

determining when a hybrid automatic repeat request ("HARQ") retransmission rate satisfies a HARQ retransmission rate threshold;

when the HARQ retransmission satisfies the HARQ retransmission threshold, identifying the UL link as a good quality link and sending acceptable link quality feedback to the network; and when the HARQ retransmission does not satisfy the HARQ retransmission threshold, identifying the UL link as a poor quality link and sending poor link quality feedback to the network.

13. The UE of claim 8, wherein the operations further comprise:

filtering the primary set of allocation parameters using one of a finite impulse response ("FIR") filter and an infinite impulse response ("IIR") filter.

14. The UE of claim 8, wherein the operations further comprise:

identifying the UL link as a poor quality link; and performing at least one of:
lowering an audio codec rate used on the UL link,
selecting a different UL link associated with a different radio access technology ("RAT"), and
triggering a hand-over to a neighboring node.

15. A method, comprising:

at a user equipment ("UE"):
comparing a first channel quality factor determined at the UE to a first threshold value, wherein the UE is connected to a network and communicates with the network on a link;

when the first channel quality factor satisfies the first threshold, identifying the link as a good quality link and sending acceptable link quality feedback to the network;

when the first channel quality factor does not satisfy the first threshold, comparing a further channel quality factor determined at the UE to a further threshold value;

when the further channel quality factor satisfies the further threshold, identifying the link as a good quality link and sending acceptable link quality feedback to the network; and when the further channel quality factor does not satisfy the further threshold, performing a further action to test a quality of the UL link.

16. The method of claim 15, wherein the first channel quality factor includes at least one of a modulation and coding scheme ("MCS") and a resource block allocation.

17. The method of claim 15, wherein the further channel quality factor includes at least one of a transmit power value, power headroom value, and a hybrid automatic repeat request ("HARQ") retransmission rate.

18. The method of claim 15, wherein the further action includes:

comparing an additional channel quality factor determined at the UE to an additional threshold value;

when the additional channel quality factor satisfies the additional threshold, identifying the link as a good quality link and sending acceptable link quality feedback to the network; and when the additional channel quality factor does not satisfy the additional threshold, identifying the link as a poor quality link and sending poor link quality feedback to the network.

19. The method of claim 15, further comprising:

filtering the first channel quality factor using one of a finite impulse response ("FIR") filter and an infinite impulse response ("IIR") filter.

20. The method of claim 15, further comprising:

identifying the UL link as a poor quality link; and performing at least one of:
- lowering an audio codec rate used on the UL link,
- selecting a different UL link associated with a different radio access technology ("RAT"), and
- triggering a hand-over to a neighboring node.

* * * * *